(12) United States Patent
Song

(10) Patent No.: US 7,949,695 B2
(45) Date of Patent: May 24, 2011

(54) TWO'S COMPLEMENT CIRCUIT

(75) Inventor: Shawn Song, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 1025 days.

(21) Appl. No.: 10/904,152

(22) Filed: Oct. 27, 2004

(65) Prior Publication Data

US 2006/0089955 A1    Apr. 27, 2006

(51) Int. Cl.
*G06F 7/00*    (2006.01)

(52) U.S. Cl. ......... 708/204; 708/200; 708/205; 708/209

(58) Field of Classification Search ............ 708/200
See application file for complete search history.

(56) References Cited

U.S. PATENT DOCUMENTS

| 4,488,252 A | * | 12/1984 | Vassar ........................... 708/505 |
| 4,831,575 A | * | 5/1989 | Kuroda ......................... 708/204 |
| 4,841,467 A | * | 6/1989 | Ho et al. ...................... 708/501 |
| 4,975,868 A | * | 12/1990 | Freerksen ..................... 708/503 |

* cited by examiner

*Primary Examiner* — Lewis A Bullock, Jr.
*Assistant Examiner* — Michael Yaary
(74) *Attorney, Agent, or Firm* — Winston Hsu; Scott Margo

(57) ABSTRACT

A operator is located between two converters that convert data between floating-point format and a predetermined format. The operator operates on predetermined format data, which consists of the same sign bit, the same exponent, and the two's complement of the mantissa of the corresponding floating-point data. When the operator is an arithmetic logic unit (ALU), the number of operations for a given calculation can be reduced.

16 Claims, 3 Drawing Sheets

TWO'S COMPLEMENT CIRCUIT

BACKGROUND OF INVENTION

1. Field of the Invention

The present invention relates to digital electronics, and more specifically, to two's complement operations in digital circuits.

2. Description of the Prior Art

In many digital systems, data is stored and handled in floating-point form. Typically, memory registers, input devices, and output devices of such systems are configured for storing, manipulating, and handling floating-point data. However, when mathematical operations are required to be performed, such systems become encumbered by numerous two's complement conversions.

FIG. 1 illustrates a schematic diagram of a four-component dot product (DP4) operation according to the prior art. Products of a multiplication, which is performed directly on the floating-point data, enter the system at step 102. For example, when performing a dot product on two four-dimensional vectors, there would be four product terms as indicated by "X". This prior art design uses three floating-point number adders to implement an addition of four floating-point numbers. Referring to FIG. 1, each block encircled by a dotted line represents a floating-point number adder. Each floating-point number adder takes two floating-point numbers as inputs, and outputs one sum being a floating-point number. When data is input, the data is transformed into a two's complement number if necessary in step 104. Next, in step 106, the data is bit shifted by the respective exponent to align the decimal point, before being intermediately added in step 108. The result of the addition in step 108 must then be converted to two's complement format if necessary in step 110 before being shifted again in step 112 to normalize the output of the floating-point number adder. Steps 114 to 122 are another floating-point number adder's corresponding steps, and further description is omitted for brevity. The final result of a floating-point number is produced for step 124.

As the examples above illustrate, performing two's complement operations in a floating-point system can be quite demanding and time consuming. Furthermore, when many two's complement conversions are required, one prior art technique is to provide additional hardware (such as converters) in each device performing two's complement operations.

SUMMARY OF INVENTION

It is therefore an objective of the invention to provide an improved circuit design to reduce the number of two's complement conversions, and to solve the above-described problems.

Briefly described, the invention comprises a first converter for receiving a first floating-point data and converting said first floating-point data into a predetermined format data; a register connected to the first converter for buffering the predetermined format data; a first shifter connected to the register for aligning the predetermined format data by a respective exponent; an operator connected to the first shifter for directly operating on the predetermined format data; a second shifter connected to the operator for normalizing the predetermined format data and for directly storing the predetermined format data to the register; and a second converter connected to the register for receiving the predetermined format data from the register, converting said predetermined format data to a second floating-point data, and outputting said second floating-point data.

It is an advantage of the invention that the operator operating within the region defined by the first and second converters reduces the number of two's complement conversions required and thereby allows hardware and processing time to be correspondingly reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
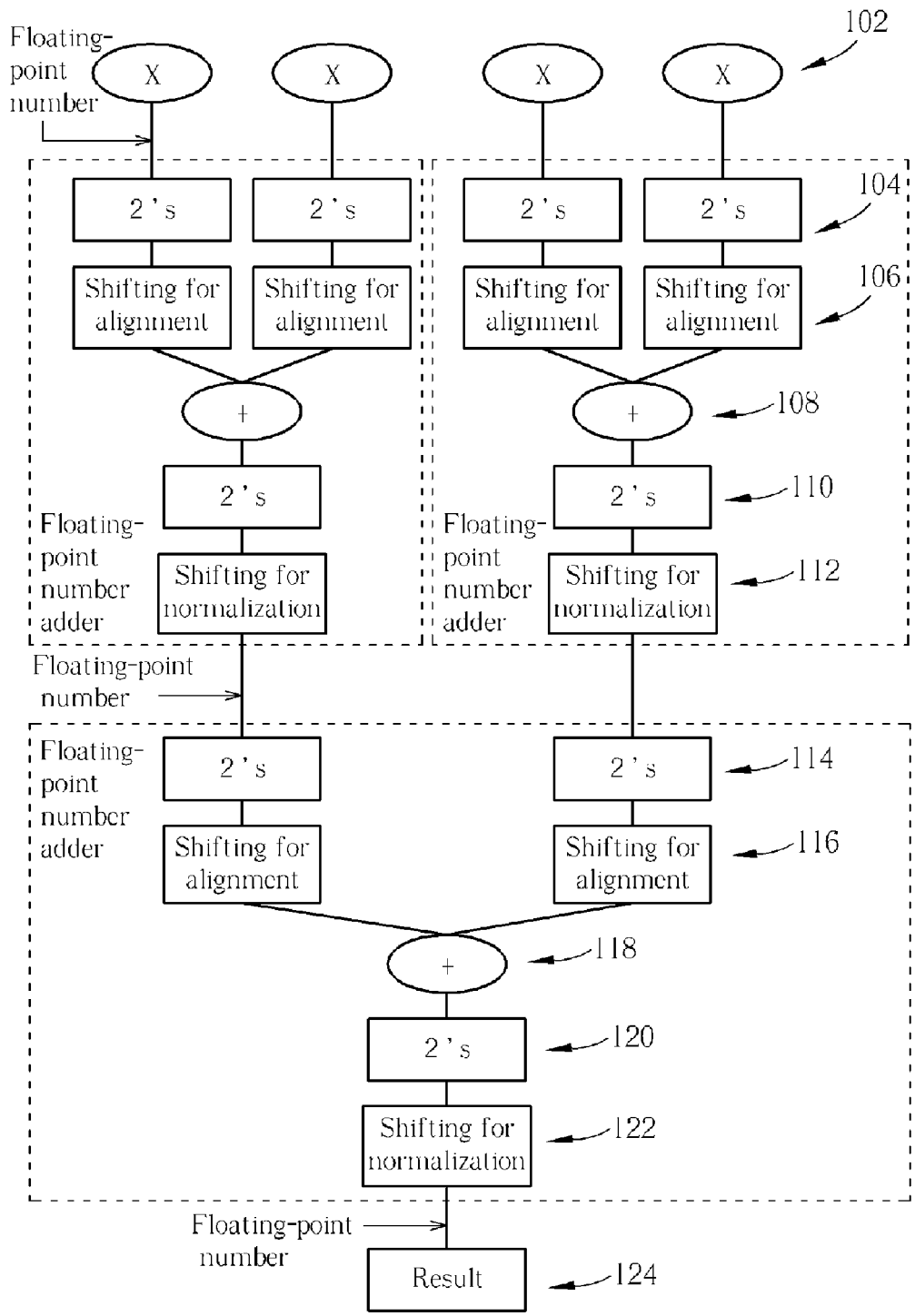
FIG. 1 is a schematic diagram of an operation according to the prior art.
Figure 2:
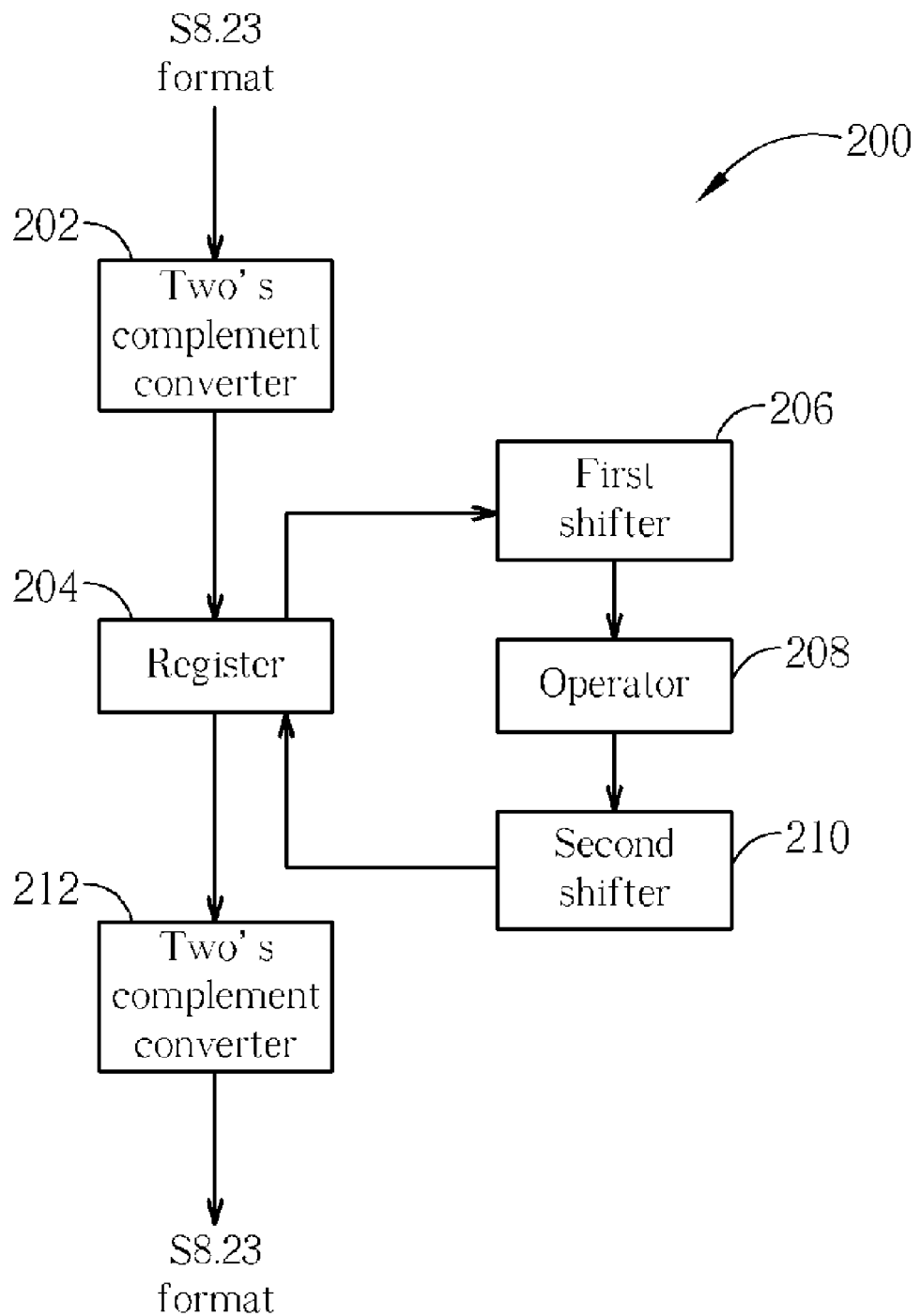
FIG. 2 is a block diagram of a digital circuit according to the present invention.

Please refer to FIG. 2 illustrating a digital circuit 200 according to the present invention. The circuit 200 can be connected between devices that use IEEE formats for floating-point numbers, for example, S8.23 (sign bit, eight-bit exponent, and 23-bit mantissa). The IEEE floating-point devices can include a floating-point processor, floating-point unit (FPU), and input/output devices (I/O controller, video card, etc.). The floating-point devices operate exclusively with floating-point data, although in other embodiments this need not be so.

The digital circuit 200 includes a first two's complement converter 202, a register 204, a first shifter 206 for alignment, an operator 208, a second shifter 210 for normalization, and a second two's complement converter 212. The first two's complement converter 202 is connected to at least one of the floating-point devices such that it can receive floating-point data (e.g., S8.23 data). The first two's complement converter 202 can be a logic array or processor capable of converting input floating-point data into a two's complement representation (described below) of such data. The output of the first two's complement converter 202 is connected to the register 204, which buffers the converted data. The output of the register 204 is connected to the first shifter 206. The first shifter 206 aligns the fixed point of the converted data so that subsequent operations can be performed. The output of the first shifter 206 is connected to the operator 208. The operator 208 performs operations such as addition, subtraction, or multiplication, on the input data. The output of the operator 208 is connected to the second shifter 210, which normalizes the result of the operations back into the two's complement representation (described below). The output of the second shifter 210 is connected to the register 204 which stores intermediate results required by the first shifter 206 and to the second two's complement converter 212 which returns the final output to the floating-point data format (e.g., S8.23).

Operation of the circuit 200 is as follows. First, data required to undergo an arithmetic operation is input into the first two's complement converter 202, which converts the floating-point data into two's complement data. Then, after being buffered in the register 204, the converted data is shifted by the first shifter 206 so as to line up the floating points of each number to undergo an operation. The operator 208 then receives the converted and shifted data and processes the required arithmetic operation. The second shifter 210 normalizes intermediate output of the operator 208, and uses the register 204 for storage. The second two's complement converter 212 converts final output back into floating-point form. As a result, two's complement arithmetic operations required by external floating-point devices can be performed exclusively in the circuit 200.

The particular two's complement format (predetermined format) used in the present invention consists of the same sign bit and exponent as in the original floating-point number, and the two's complement of the mantissa of the original floating-point number. That is, to obtain this representation, the sign bit and exponent are preserved, while the mantissa is formed into a two's complement representation (i.e. 0 becomes 1, 1 becomes 0, add 1). Examples of both the floating-point and the present invention two's complement form for the decimal number −15803208 are in Tables 1 and 2 respectively as follows:

TABLE 1

IEEE Floating Point
1100 1011 0111 0001 0010 0011 0100 1000

| Sign | Exponent | Mantissa |
|---|---|---|
| 1 | 100 1011 0 | 111 0001 0010 0011 0100 1000 |

Hexadecimal = CB712348

TABLE 2

Present Invention Two's Complement Representation
1100 1011 0000 1110 1101 1100 1011 1000

| Sign | Exponent | Mantissa |
|---|---|---|
| 1 | 100 1011 0 | 000 1110 1101 1100 1011 1000 |

Hexadecimal = CB0EDCB8

Conversion between floating-point format (the IEEE format being an example) and this two's complement format is performed by the first and second two's complement converters 202, 212, which are one-way converters. In another embodiment, a single two-way converter can be used.

Using the above-described two's complement representation, addition and subtraction can be easily realized. With regard to multiplication, consider the following three equations for multiplications of positive and negative 24-bit numbers, which shows that multiplication in two's complement form produces the correct results:

Equation 1:

000000A1A2A3A4A5A6 × 000000B1B2B3B4B5B6
= C1C2C3C4C5C6C7C8C9C10C11C12 where:

0 is a digit zero and "x" denotes multiplication;

A1 . . . A6 are hexadecimal digits of a first positive multiplicand;

B1 . . . B6 are hexadecimal digits of a second positive multiplicand; and

C1 . . . C12 are hexadecimal digits of the product.

Equation 2:

000000A1A2A3A4A5A6 × (FFFFFFFFFFFF − 000000B1B2B3B4B5B6 + 1)
= A1A2A3A4A5A6000000000000 − C1C2C3C4C5C6C7C8C9C10C11C12
= 000000000000 − C1C2C3C4C5C6C7C8C9C10C11C12
= FFFFFFFFFFFF − C1C2C3C4C5C6C7C8C9C10C11C12 + 1 where:

0 is a digit zero, and F is hexadecimal of 15;

A1 . . . A6 are hexadecimal digits of a first positive multiplicand;

B1 . . . B6 are hexadecimal digits of a positive form of a negative multiplicand; and C1 . . . C12 are hexadecimal digits of the product.

Thus, according to Equation 2, A multiplied by the two's complement form of B results in the two's complement form of C.

Equation 3:

(FFFFFFFFFFFF − 000000A1A2A3A4A5A6 + 1) × (FFFFFFFFFFFF − 000000B1B2B3B4B5B6 + 1)
= 1000000000000000000000000 − A1A2A3A4A5A6000000000000 − B1B2B3B4B5B6000000000000 + C1C2C3C4C5C6C7C8C9C10C11C12
= C1C2C3C4C5C6C7C8C9C10C11C12 where:

0 is a digit zero, and F is hexadecimal of 15;

A1 . . . A6 are hexadecimal digits of a positive form of a first negative multiplicand;

B1 . . . B6 are hexadecimal digits of a positive form of a second negative multiplicand; and C1 . . . C12 are hexadecimal digits of the product.

Thus, according to Equation 3, the two's complement form of A multiplied by the two's complement form of B results in C.

Depending on the signs of the numbers to be multiplied, the above equations show that the present invention is also suitable for multiplication. For two positive multiplicands Equation 1 applies; for one positive and one negative multiplicand Equation 2 applies; for two negative multiplicands Equation 3 applies.

Figure 3:
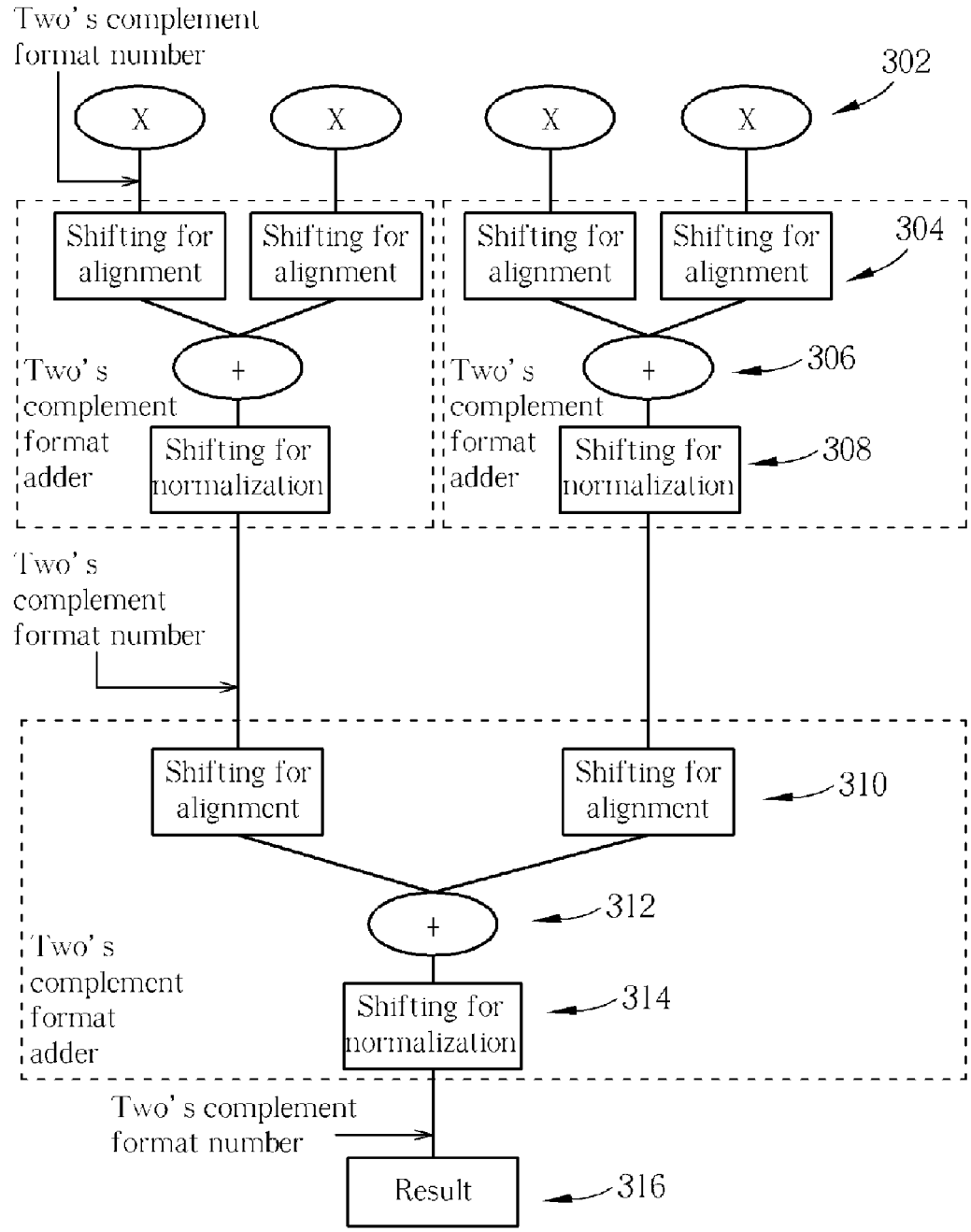
FIG. 3 is a schematic diagram of an operation according to the present invention.

FIG. 3 illustrates a schematic diagram of a DP4 operation, i.e. a dot product operation, according to the present invention. Such an operation could be performed by the above-mentioned circuit 200, for example. This design according to the present invention uses three two's complement format adders to implement an addition of four two's complement format numbers, where each block encircled by the dotted line represents a single adder. Each adder can take two two's complement format numbers as inputs and output one sum being a two's complement format number. In step 302, four elements of two's complement data are entered. The data is bit shifted in step 304 by the respective exponent to align the decimal point before being intermediately added in step 306. The result of the addition of step 306 must then be shifted again in step 308 to normalize the output of the two's complement format adder. Steps 310 to 314 show another two's complement format adder' embodiment, and further description is omitted for brevity. Referring to the circuit 200 of FIG. 2, the steps 306, 312 are performed by the operator 208. The steps 304, 310 are performed by the first (aligning) shifter 206. The steps 308, 314 are performed by the second (normalizing) shifter 210. After the multiplication is completed, the second two's complement converter 212 outputs the result in floating-point form.

Table 3 below illustrates a summary of the number of two's complement operations for conventional and present invention methods for addition, subtraction, and multiplication. Redundant combinations of signs are omitted.

TABLE 3

Number of Two's Complement Operations for Conventional and Present Invention Methods

| Sign of First Term | Operation | Sign of Second Term | Sign of Result | Conventional | Present Invention |
|---|---|---|---|---|---|
| + | + | + | + | 0 | 0 |
| + | + | − | + | 1 | 0 |
| + | + | − | − | 2 | 0 |
| − | + | − | − | 0 | 0 |
| + | − | + | + | 1 | 1 |
| + | − | + | − | 2 | 1 |
| + | − | − | + | 0 | 1 |
| − | − | + | − | 3 | 1 |
| − | − | − | + | 1 | 1 |
| − | − | − | − | 2 | 1 |
| + | × | + | + | 0 | 0 |
| + | × | − | − | 0 | 0 |
| − | × | − | + | 0 | 0 |

It can be seen that using the above-described two's complement representation in which the sign and exponent are kept while the mantissa is complemented (e.g. Table 2), the present invention two's complement region allows for an overall reduction in the amount of two's complement operations.

Generally, the operator 208 and register 204 operate exclusively on two's complement data. However, in other embodiments, this need not be a requirement. For example, the operator might be designed to handle both conventional floating-point operations and the negative mantissa operations of the present invention. In addition, other examples of processors besides the operator 208 include a central processing unit (CPU) and an arithmetic coprocessor (math coprocessor).

In contrast to the prior art, the present invention utilizes a two's complement region bounded by two converters in which a format having two's complemented mantissas is used for calculations. Data outside this region is in floating-point format. This significantly reduces the number of two's complement operations when compared with the conventional technique. When the number of operations can be reduced, the processing time and hardware required can also be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A two's complement digital circuit comprising:
a first converter receiving a first floating-point data and converting said first floating-point data into a two's complement format data by preserving the sign bit and the exponent and by taking the two's complement of the mantissa;
a register connected to the first converter buffering the two's complement format data from the first converter;
a first shifter connected to the register fetching the two's complement format data from the register and aligning the two's complement format data by a respective exponent;
an operator connected to the first shifter directly operating on the two's complement format data;
a second shifter connected to the operator normalizing the two's complement format data and directly storing the two's complement format data to the register; and
a second converter connected to the register receiving the two's complement format data from the register, converting said two's complement format data to a second floating-point data by preserving the sign bit and the exponent and by taking the two's complement of the mantissa to obtain the second floating-point data, and outputting said second floating-point data.

2. The digital circuit of claim 1 wherein the two's complement format data consists of the same sign bit, the same exponent, and the two's complement of the mantissa of the corresponding floating-point data.

3. The digital circuit of claim 1 wherein the operator and the register operate exclusively on two's complement format data.

4. The digital circuit of claim 1 wherein the operator is selected from a group consisting of: an arithmetic logic unit (ALU), a central processing unit (CPU), and an arithmetic coprocessor.

5. A two's complement digital circuit comprising:
a first converter receiving a plurality of first floating-point data and converting the first floating-point data into a plurality of two's complement format data by preserving the sign bit and the exponent and by taking the two's complement of the mantissa;
a register connected to the first converter buffering the two's complement format data;
a first shifter connected to the register; an operator connected to the first shifter; a second shifter connected to the operator and the register respectively, wherein two of the two's complement format data are fetched from the register; the first shifter aligns the two of the two's complement format data fetched from the register;
a first operation is performed for operating the two of the two's complement format data to obtain a first result with two's complement format;
the first result is normalized and buffered in the register;
the first result and one of the two's complement format data are fetched from the register, wherein the one of the two's complement format data is not operated in the first operation;
the first shifter aligns the first result and the one of the two's complement format data;
a second operation is performed for operating the first result and the one of the two's complement format data to obtain a second result with two's complement format; and the second result is normalized and buffered in the register; and
a second converter connected to the register receiving the second result with two's complement format data from the register and converting the second result to a second floating-point data by preserving the sign bit and the exponent and by taking the two's complement of the mantissa to obtain the second floating-point data, and outputting the second floating-point data.

6. The digital circuit of claim 5 wherein the two's complement format data consists of the same sign bit, the same exponent, and the two's complement of the mantissa of the corresponding floating-point data.

7. The digital circuit of claim 5 wherein the operator is selected from a group consisting of: an arithmetic logic unit (ALU), a central processing unit (CPU), and an arithmetic coprocessor; wherein the arithmetic logic unit performs addition, subtraction, or multiplication.

8. A method for performing a two's complement operation, the method comprising:
- receiving a plurality of floating-point data;
- converting the floating-point data into a plurality of two's complement format data by preserving the sign bit and the exponent and by taking the two's complement of the mantissa;
- buffering the two's complement format data into a register;
- fetching two of the two's complement format data from the register;
- performing a first operation for the two of the two's complement format data fetched from the register to obtain a first result with two's complement format;
- buffering the first result of the first operation into the register;
- fetching the first result and one of the two's complement format data from the register, wherein the one of the two's complement format data is not operated in the first operation;
- performing a second operation for the first result and the one of the two's complement format data to obtain a second result with two's complement format;
- buffering the second result of the second operation into the register;
- converting the second result of the second operation fetched from the register into floating-point data by preserving the sign bit and the exponent and by taking the two's complement of the mantissa to obtain a resultant floating-point data; and
- outputting the resultant floating-point data.

9. The method of claim 8 wherein the first operation includes addition, subtraction, or multiplication.

10. The method of claim 8 wherein the second operation includes addition, subtraction, or multiplication.

11. The method of claim 8 wherein the one of the two's complement format data in the second operation is a third result by performing a third operation with another two of the two's complement format data from the register.

12. The method of claim 11 wherein the third operation includes addition, subtraction, or multiplication.

13. The method of claim 8 further comprising, before performing the first operation to obtain the first result, aligning the fetched two of the two's complement format data from the register.

14. The method of claim 8 further comprising, before performing the second operation to obtain the second result, aligning the fetched the first result and the one of the two's complement format data from the register.

15. The method of claim 8 wherein the two's complement format data consists of the same sign bit, the same exponent, and the two's complement of the mantissa of the corresponding floating-point data.

16. The digital circuit of claim 5 wherein the one of the two's complement format data in the second operation is a third result by performing a third operation with another two of the two's complement format data from the register.

* * * * *